(No Model.)
J. E. KELSEY.
BASIN TRAP CLEARER.
No. 303,858.  Patented Aug. 19, 1884.
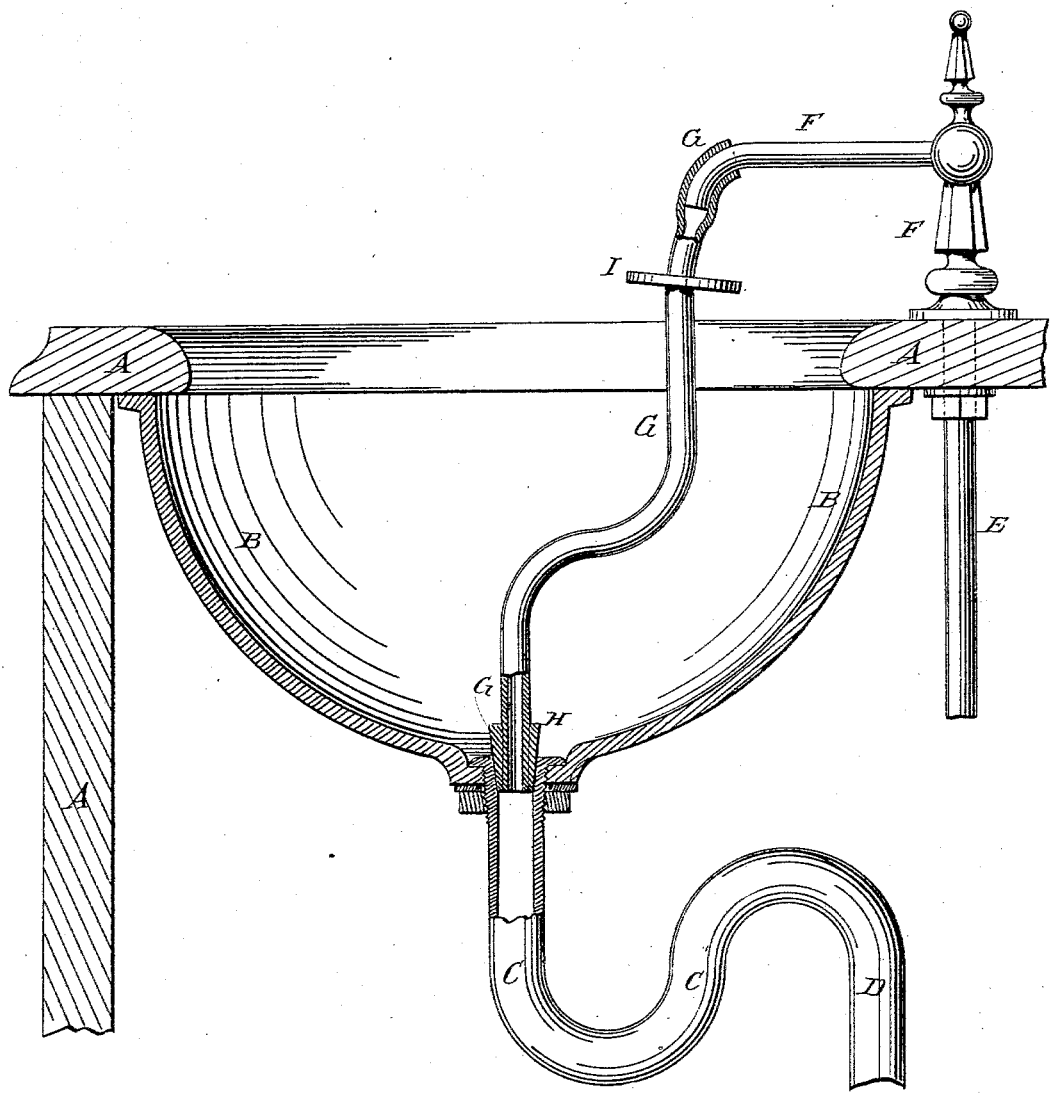
WITNESSES:
Chas. Nida.
C. Sedgwick
INVENTOR:
J. E. Kelsey
BY Munn & Co
ATTORNEYS.

UNITED STATES PATENT OFFICE.

JAMES E. KELSEY, OF BROOKLYN, NEW YORK.

BASIN-TRAP CLEARER.

SPECIFICATION forming part of Letters Patent No. 303,858, dated August 19, 1884.

Application filed August 28, 1883. (No model.)

*To all whom it may concern:*

Be it known that I, JAMES E. KELSEY, of Brooklyn, in the county of Kings and State of New York, have invented a new and useful Improvement in Basin-Trap Clearers, of which the following is a full, clear, and exact description.

Reference is to be had to the accompanying drawing, forming a part of this specification, and which is a side elevation, partly in section, of my improvement, illustrating its use.

My invention consists in certain improvements in that class of trap-clearers in which a flexible tube is used to connect the faucet with the outlet-pipe; and the invention consists in the construction and arrangement of parts, as will be hereinafter fully described, and specifically set forth in the claims.

A represents the stand; B, the basin; C, the trap; D, the discharge-pipe; E, the water-pipe, and F the faucet, about the construction of which parts there is nothing new.

G is a pipe, of rubber or other flexible material, of sufficient length to extend from the discharge-nozzle of the faucet F to the discharge-opening in the bottom of the basin B. The lower end of the flexible pipe G is connected with a hollow stopper, H, of rubber or other suitable material, and made of such a size as to fit into the discharge-opening of the basin B.

In using the implement the other end of the pipe G is placed upon the nozzle of the faucet F, and the stopper H is inserted in the discharge-opening of the basin B. The faucet F is then opened, and the water is forced through the pipe G into the trap C by the pressure upon the water in the pipe E, so that any sediment or other obstruction that may be in the trap C will be forced out into the discharge-pipe D, and thence to the sewer.

Upon the pipe G, near its upper end, is placed a disk, I, of rubber or other suitable material, to be used instead of the stopper H in case the discharge-opening in the bottom of the basin B be too large to be closed by the stopper H. In this case the pipe G is reversed, the end provided with the stopper H being placed upon the nozzle of the faucet F, and the other end being introduced into the discharge-opening of the basin B, so that the disk I will cover and close the said discharge-opening.

I am aware that it is not new to connect the faucet and waste-pipe by means of a flexible tube provided with an air bulb; also, that it is not new to place a perforated tube in a water-closet trap and force water through said apertured tube by a suitable pump, and I do not desire to claim such constructions as of my invention.

Having thus described my invention, I claim as new and desire to secure by Letters Patent—

1. A clearing-pipe for basins, consisting of the flexible pipe G, provided at one end with a hollow tapering stopper, whereby the waste-pipe and faucet may be connected, for the purpose set forth.

2. A clearing-pipe for basins, consisting of the flexible pipe G and the disk I thereon, for the purpose set forth.

3. A basin-trap clearer, consisting of a flexible tube, G, for connecting the faucet with the outlet or waste-pipe, provided at one end with a hollow flexible stopper, H, and near its other end with a flexible disk, I, whereby the clearer is adapted to be applied to basins having large or small outlets by simply reversing the tube, substantially as set forth.

JAMES E. KELSEY.

Witnesses:
 JAMES T. GRAHAM,
 C. SEDGWICK.